(12) United States Patent
Herfert et al.

(10) Patent No.: US 9,994,188 B1
(45) Date of Patent: Jun. 12, 2018

(54) GAS GENERATING SYSTEM

(75) Inventors: Kyle W. G. Herfert, Lenox, MI (US);
Gene G. Bishop, Clarkston, MI (US)

(73) Assignee: Joyson Safety Systems Acquisition LLC, Sterling Heights, MI (US)

( * ) Notice: Subject to any disclaimer, the term of this patent is extended or adjusted under 35 U.S.C. 154(b) by 1078 days.

(21) Appl. No.: 13/482,267

(22) Filed: May 29, 2012

Related U.S. Application Data

(60) Provisional application No. 61/491,056, filed on May 27, 2011.

(51) Int. Cl.
*B60R 21/264* (2006.01)
*B60R 21/262* (2011.01)
*B60R 21/26* (2011.01)

(52) U.S. Cl.
CPC ........ *B60R 21/264* (2013.01); *B60R 21/2644* (2013.01); *B60R 21/262* (2013.01); *B60R 2021/26011* (2013.01); *B60R 2021/2642* (2013.01); *B60R 2021/2648* (2013.01); *B60R 2021/26076* (2013.01)

(58) Field of Classification Search
CPC ..... B60R 21/26; B60R 21/262; B60R 21/264; B60R 21/2644; B60R 2021/26011; B60R 2021/2642; B60R 2021/2648; B60R 2021/26076
USPC ................... 102/530; 280/741, 736
See application file for complete search history.

(56) References Cited

U.S. PATENT DOCUMENTS

| | | | |
|---|---|---|---|
| 6,793,244 B1 * | 9/2004 | Katsuda et al. | 280/741 |
| 6,805,377 B2 | 10/2004 | Krupp et al. | 280/741 |
| 7,073,820 B2 * | 7/2006 | McCormick | 280/741 |
| 7,080,854 B2 | 7/2006 | Burns et al. | 280/741 |
| 7,097,203 B2 | 8/2006 | Burns et al. | 280/741 |
| 7,192,055 B2 | 3/2007 | Stevens et al. | 280/741 |
| 7,237,801 B2 * | 7/2007 | Quioc et al. | 280/736 |
| 7,293,798 B2 | 11/2007 | Burns et al. | 280/741 |
| 7,325,829 B2 * | 2/2008 | Kelley et al. | 280/736 |
| 7,654,565 B2 | 2/2010 | McCormick et al. | 280/736 |
| 8,172,262 B2 * | 5/2012 | Mayville et al. | 280/741 |
| 8,297,652 B2 * | 10/2012 | Tauchen | 280/741 |
| 2002/0180186 A1 * | 12/2002 | Hesse et al. | 280/728.2 |
| 2005/0235863 A1 | 10/2005 | Stevens | 102/531 |
| 2006/0043716 A1 * | 3/2006 | Quioc et al. | 280/741 |
| 2010/0186616 A1 * | 7/2010 | Reichelt et al. | 102/530 |

* cited by examiner

*Primary Examiner* — James S Bergin
(74) *Attorney, Agent, or Firm* — Meunier Carlin & Curfman LLC

(57) ABSTRACT

A gas generating system includes a first housing and a second housing contained within the first housing and engaging the first housing in an interference fit.

11 Claims, 3 Drawing Sheets

GAS GENERATING SYSTEM

CROSS REFERENCE TO RELATED APPLICATIONS

This application claims the benefit of U.S. Provisional Application Ser. No. 61/491,056 filed on May 27, 2011.

BACKGROUND OF THE INVENTION

The embodiments of the present invention relate generally to gas generating systems and, more particularly, to gas generating systems for use in applications such as inflatable occupant restraint systems in motor vehicles.

Installation of inflatable occupant protection systems, generally including airbag systems, as standard equipment in all new vehicles has intensified the search for smaller, lighter and less expensive protection systems. Accordingly, since the inflation gas generating system used in such protection systems may be the heaviest and most expensive component of the protection system, there is an ongoing need for a lighter and less expensive gas generating systems.

SUMMARY OF THE INVENTION

In one aspect of the embodiments of the present invention, a gas generating system is provided including a first housing and a second housing contained within the first housing and engaging the first housing in an interference fit.

In another aspect of the embodiments of the present invention, a gas generating system is provided including a first housing and a second housing positioned within the first housing and spaced apart from the first housing so as to form a gas flow passage therebetween. The second housing engages the first housing in an interference fit. The interference fit forms a closed end of the gas flow passage.

DETAILED DESCRIPTION

Figure 1:
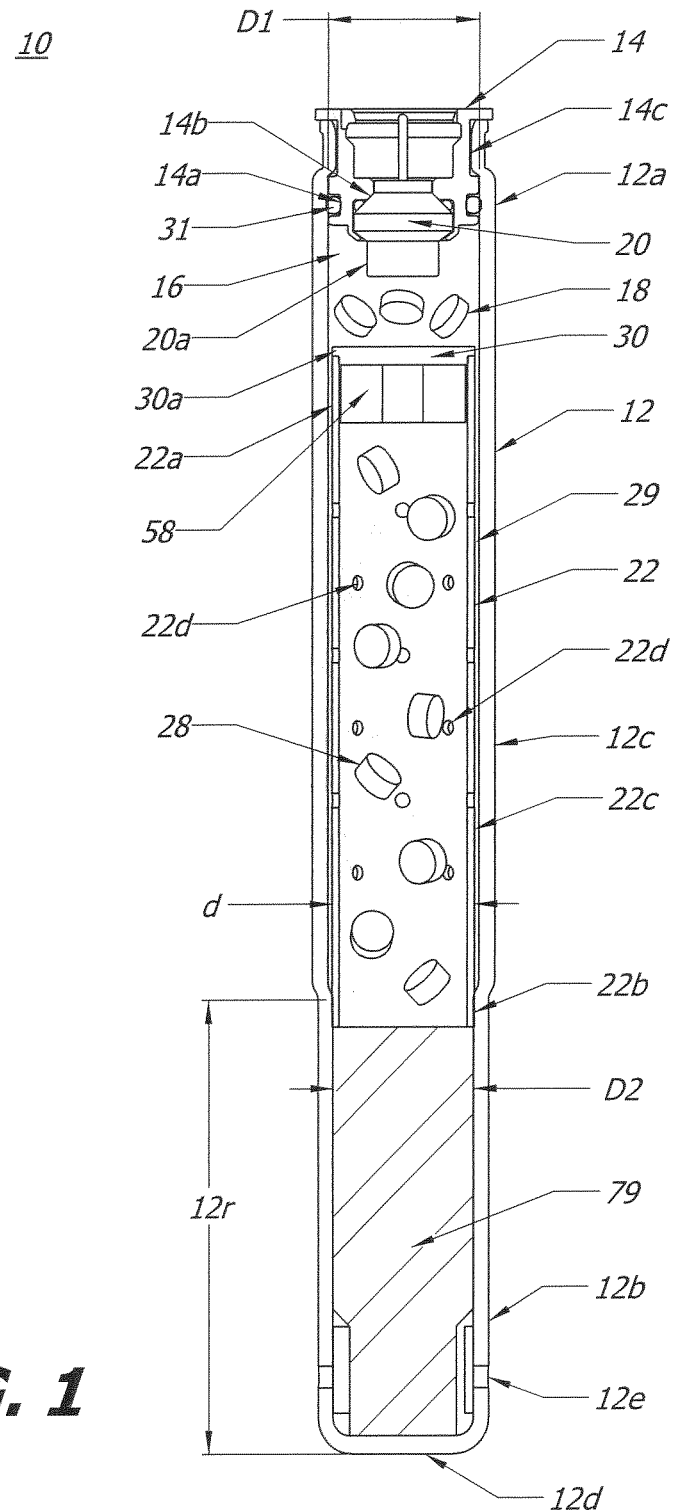
FIG. 1 is a cross-sectional side view of a gas generating system in accordance with a first embodiment of the present invention.

Referring to FIG. 1, a gas generating system 10 in accordance with one embodiment of the present invention includes a substantially cylindrical outer housing 12 having a first end 12a, a second end 12b opposite the first end, and a wall 12c extending between the ends to define a housing interior cavity. First housing 12 serves to contain and aid in positioning the other elements of the gas generating system.

In the embodiment shown in FIG. 1, a nozzle 12d is formed at housing second end 12b containing one or more gas exit orifices 12e for enabling fluid communication between an interior of the housing and an associated inflatable device (for example, an airbag or a safety belt pretensioner incorporated into a vehicle occupant protection system.) In the embodiment shown in FIG. 1, first housing 12 and nozzle 12d are deep drawn as a single piece. Gas exit orifice(s) 12e are then provided in first housing second end 12b by drilling, punching, or other suitable means. In an alternative embodiment (not shown), the gas exit orifices may be incorporated into a gas exit manifold which is formed separately from the first housing and then welded or otherwise suitably fixed to the first housing during assembly of the gas generating system.

In the embodiment shown in FIG. 1, at least a portion of first housing 12 telescopes or tapers down from a first, relatively larger inner diameter or other interior dimension D1 to a second, relatively narrower inner diameter or interior dimension D2 proximate first housing second end 12b. The dimension D2 is sized with respect to an outer diameter or dimension d of an second housing 22 (described below) such that an interference fit is formed between the second housing and the reduced-dimension portion 12r of the first housing when a portion of the second housing is inserted into housing portion 12r. This configuration aids in securing the second housing to the first housing, and also aids in positioning and maintaining the second housing within the first housing so as to provide an annular gas flow passage 29 extending between first housing 12 and second housing 22. In this embodiment, second housing 22 is unsupported at its first end. Thus, the second housing 22 is supported in cantilever fashion within the first housing interior.

The dimensions D2 and d and the total contact area between second housing 22 and first housing 12 in the reduced-dimension region 12r may be specified according to the requirements of a particular application, to aid in providing a gas flow path 29 flow of substantially uniform and constant cross-sectional area, depending on such factors as the length of the second housing, the degree of interference-fit desired between the parts, and other pertinent factors. First housing 12 is made from a metallic material or any other suitable material and may be a cast, stamped, deep-drawn, extruded, molded or otherwise suitably formed. The tapered portion 12r of the housing may be formed either during initial fabrication of the housing, or in a secondary operation after fabrication of the bulk housing, using crimping or any other suitable method.

An end closure 14 is secured at or within housing first end 12a to hermetically seal the housing end and to provide a mounting structure for a known igniter assembly 20. End closure 14 has formed therealong a peripheral groove 14a, a central orifice 14b, and a peripheral cavity or recessed portion 14c. A portion of housing first end 12a may be crimped or otherwise deformed into recessed portion 14c to secure the end closure to the first housing. Alternatively, other methods of securing the end closure within (or to) housing 12 may be employed. An O-ring or other resilient seal 31 may be positioned in groove 14a so as to engage housing 12 when the end closure is inserted into the housing, thereby forming a hermetic seal between the housing and the end closure. End closure 14 may be stamped, extruded, cast, molded, or otherwise formed from carbon steel, stainless steel, a polymer, or any other suitable material.

Referring again to FIG. 1, an igniter assembly 20 is positioned and secured within end closure central orifice 14b so as to enable operative communication between a cavity 16 containing an ignition compound 18 and an igniter 20a incorporated into the igniter assembly, for igniting ignition compound 18 upon activation of the gas generating system. Igniter assembly 20 may be secured in central orifice 14b using any one of several known methods, for example, by welding, crimping, using an interference fit, or by adhesive application. An igniter assembly suitable for the application described herein may be obtained from any of a variety of known sources, for example Primex Technologies, Inc. of Redmond, Wash. or Aerospace Propulsion Products by, of The Netherlands.

As seen in FIG. 1, second housing 22 is spaced apart from end closure 14 and igniter assembly 20 to provide a cavity 16 for containing a pyrotechnic compound 18 (for example, a known booster composition) therein.

Referring again to FIG. 1, a quantity of a pyrotechnic compound 18 is contained within cavity 16. In the embodiment shown in FIG. 1, pyrotechnic compound 18 is a known or suitable ignition or booster compound, whose combustion ignites a second, main gas generant charge 28 positioned in a combustion chamber defined by the interior of second housing 22. One or more autoignition tablets (not shown) may be placed in cavity 16, allowing ignition of pyrotechnic compound 18 upon external heating in a manner well-known in the art.

In the embodiment shown in FIG. 1, second housing 22 is generally cylindrical and is positioned within first housing 12 and secured coaxially within first housing reduced-dimension portion 12r, as previously described. Second housing 22 contains a gas generant material 28 (described below) and serves as a combustion chamber for the gas generant.

Second housing has a first end 22a, a second end 22c, and a wall 22c extending between the ends. A plurality of orifices 22d are spaced apart along wall 22c to enable fluid communication between gas flow passage 29 and the interior of the second housing. Any desired arrangement and/or number of orifices 22d may be provided, depending on the requirements of a particular application.

As seen in FIG. 1, when second housing second end 22b is inserted into first housing reduced-dimension portion 12r, second housing first end 22a is held spaced apart from first housing wall 12c so as to form an open end of annular gas flow passage 29. Second housing second end 22b opens toward first housing second end 12b. Second housing first end 22a is sealed so as to prevent combustion products resulting from ignition of booster material 18 from entering the second housing via the first end 22a. Second housing 22 may be extruded, deep drawn, or otherwise formed from a metallic material or any other suitable material.

In the embodiment shown in FIG. 1, second housing first end 22a is sealed with a bulkhead or divider 30 which is press-fit, crimped, adhesively attached or otherwise suitably secured within (or to) second housing end 22a so as to maintain the divider in position within the second housing when the divider is subjected to gas pressures acting on either side of the divider. In one embodiment, the divider is secured to second housing first end 22a so as to affect a gas-tight seal between divider 30 and second housing 22. Divider 30 has a shoulder 30a extending along its periphery. Shoulder 30a is configured so that an end portion of second housing 22 having a predetermined outer diameter may be positioned to abut the shoulder. Divider 30 may be formed by stamping, casting, molding, or any other suitable process from a metallic material or any other suitable material.

Referring again to FIG. 1, a cushion or pad 58 is positioned within second housing 22 proximate the second housing second end. Pad 58 aids in cushioning the gas generant against vibration and impact and may aid in holding the gas generant material in place. Pad 58 may be formed from, for example, a ceramic fiber material or any other suitable material.

Referring again to FIG. 1, a gas generant composition 28 is positioned within second housing 22. It has been found that the gas generator embodiments described herein operate most favorably with a high gas-yield, low solids-producing gas generant composition, such as a "smokeless" gas generant composition. Such gas generant compositions are exemplified by, but not limited to, compositions and processes described in U.S. Pat. Nos. 6,210,505, and 5,872,329, each incorporated by reference herein. As used herein, the term "smokeless" should be generally understood to mean such propellants as are capable of combustion yielding at least about 85% gaseous products, and preferably about 90% gaseous products, based on a total product mass; and, as a corollary, no more than about 15% solid products and, preferably, about 10% solid products, based on a total product mass. U.S. Pat. No. 6,210,505 discloses various high nitrogen nonazide gas compositions comprising a non-metal salt of triazole or tetrazole fuel, phase stabilized ammonium nitrate (PSAN) as a primary oxidizer, a metallic second oxidizer, and an inert component such as clay or mica. U.S. Pat. No. 5,872,329 discloses various high nitrogen nonazide gas compositions comprising an amine salt of triazole or tetrazole fuel, and phase stabilized ammonium nitrate (PSAN) as an oxidizer. Alternatively, any gas generant material suitable for a given application may be employed. Also, the gas generant material shown in FIG. 1 is in tablet form. However, the gas generant material used may have any geometry or physical structure suitable for a particular application.

A filter 79 is positioned along a flow path of gases generated by combustion of gas generant material 28 through the gas generating system, between the interior of second housing 22 and first housing gas exit openings 12e. In the embodiment shown in FIG. 1, filter 79 is positioned within first housing second end 12b and is configured to abut the open second end 22b of second housing 22 so as to receive generated gases directly from the second housing combustion chamber. The filter may comprise any suitable metallic mesh, woven wire cloth, or other suitable filter material. Examples of suitable materials are known and obtainable from commercially available sources (for example, Wayne Wire Cloth Products, Inc. of Kalkaska, Mich.)

Figure 2:
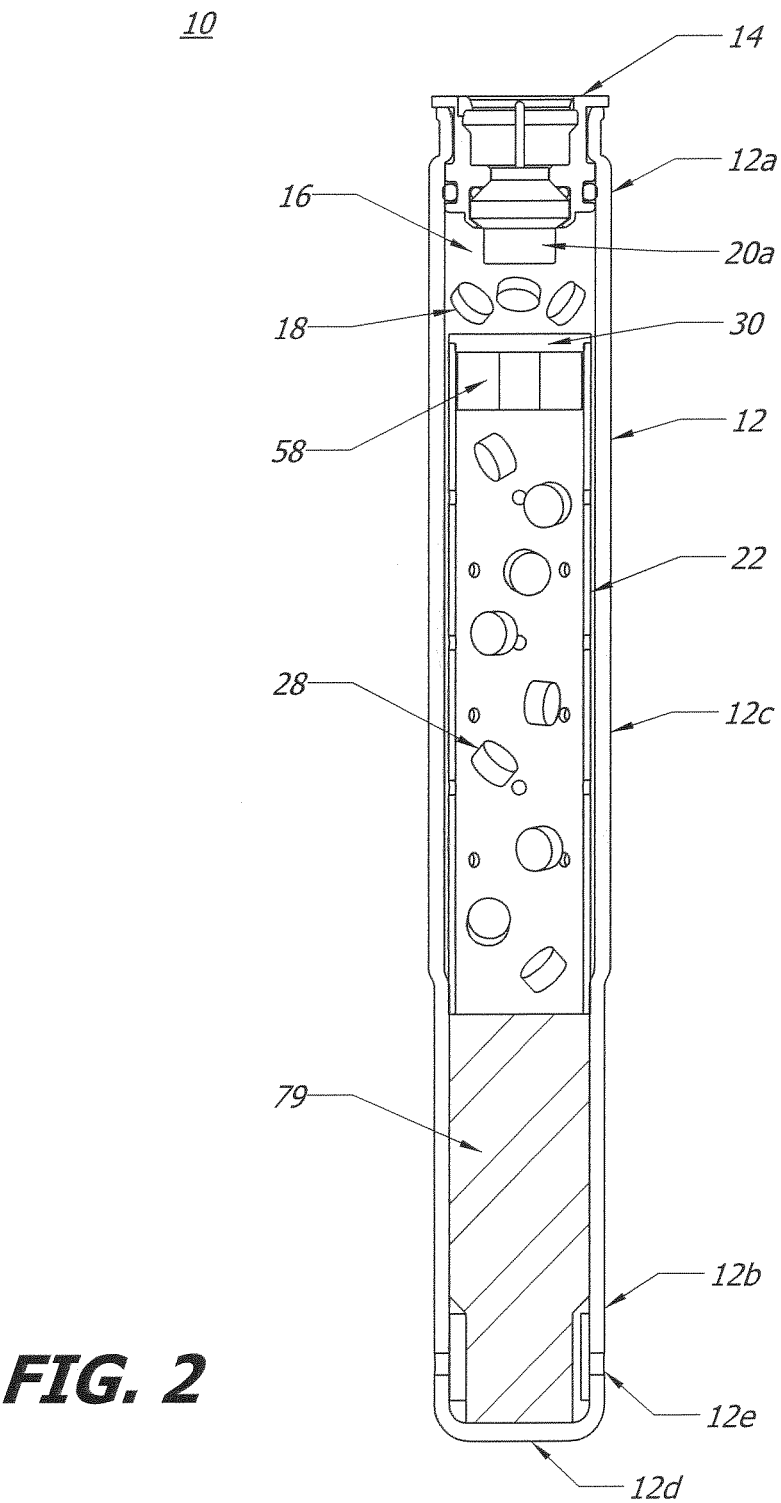
FIG. 2 is the cross-sectional side view of FIG. 1 showing operation of the embodiment of FIG. 1.

FIG. 2 shows the operation of the embodiment shown in FIG. 1.

Upon receipt of a signal from a crash sensor or other system activation signal source, an electrical activation signal is sent to igniter 20a. Combustion products from the igniter expand into cavity 16, igniting booster compound 18 positioned in the cavity. The combustion products and generated gases follow the paths indicated by the arrows shown in FIG. 2. Because access to the second housing interior is blocked at second housing first end 22a, igniter combustion products impinge upon divider 30 and are redirected radially outwardly along the divider to the open end of gas flow passage 29. The combustion products flow into and along the passage 29, then radially inwardly into the interior of the second housing via openings 22d, igniting the gas generant material 28. The gases generated by combustion of gas generant 28 are then directed along the second housing interior through filter 79, then out of first housing 12 through gas exit orifices 12e into an associated gas-actuatable device.

Figure 3:
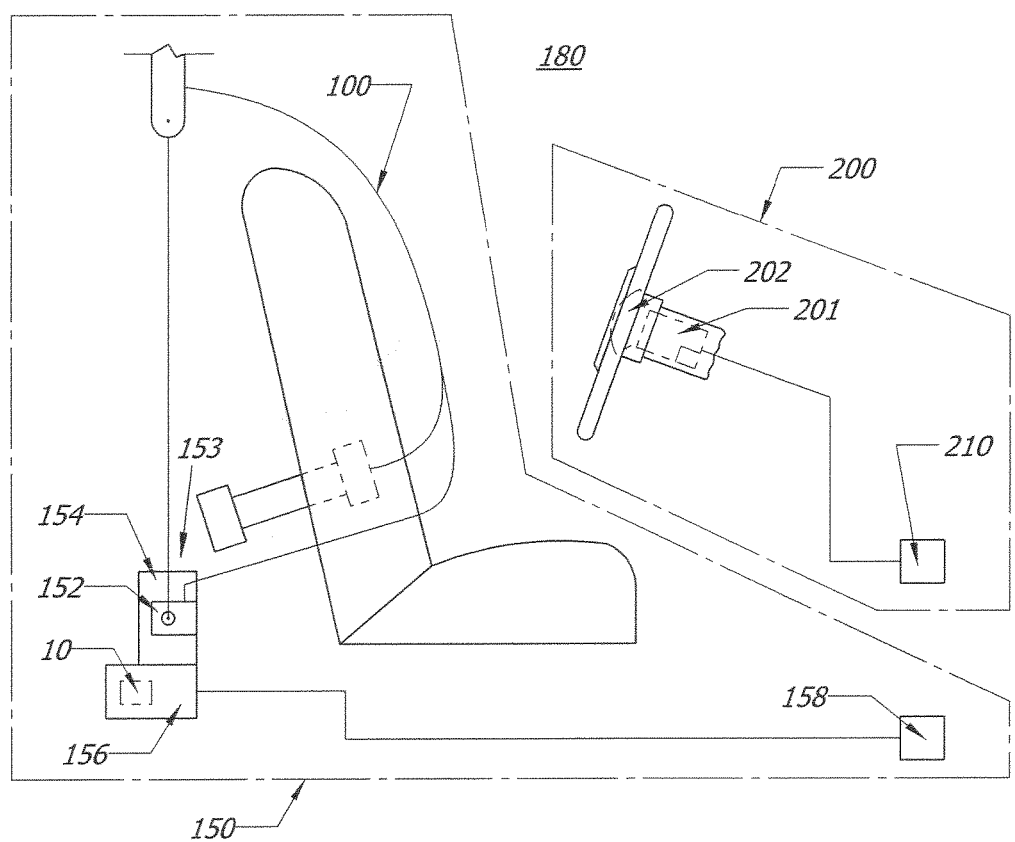
FIG. 3 is a schematic view of a gas generating system in accordance with an embodiment of the present invention as employed in a vehicle occupant protection system.

Referring now to FIG. 3, an embodiment of the gas generating system 10 described above may also be incorporated into any of a variety of vehicle occupant protection system elements. In one example, the gas generating system is incorporated into a safety belt assembly 150 for pretensioning the safety belt.

FIG. 3 shows a schematic diagram of one exemplary embodiment of an exemplary safety belt assembly 150. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical gas-actuated pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) operates in conjunction with a crash sensor algorithm that signals actuation of belt pretensioner 156 via, for example, activation of igniter 20a (not shown in FIG. 3) incorporated into the gas generating system. U.S. Pat. Nos. 6,505,790 and 6,419,177, previously incorporated herein by reference, provide illustrative examples of pretensioners actuated in such a manner.

Referring again to FIG. 3, safety belt assembly 150 may also be incorporated into a broader, more comprehensive vehicle occupant restraint system 180 including additional elements such as an airbag system 200. Airbag system 200 includes at least one airbag 202 and a gas generating system 201 coupled to airbag 202 so as to enable fluid communication with an interior of the airbag. Airbag system 200 may also include (or be in communication with) a crash event sensor 210. Crash event sensor 210 operates in conjunction with a known crash sensor algorithm that signals actuation of airbag system 200 via, for example, activation of airbag gas generating system 10 in the event of a collision.

It should be appreciated that safety belt assembly 150, airbag system 200, and more broadly, vehicle occupant protection system 180 exemplify but do not limit uses of gas generating systems contemplated in accordance with the present invention. In addition, it should be appreciated that a gas generating system in accordance with an embodiment described herein may be used in the airbag system or in other vehicle occupant protection system elements requiring a gas generating system for operation.

It will be understood that the foregoing description of the embodiments of the present invention is for illustrative purposes only. As such, the features herein disclosed are susceptible to a number of modifications commensurate with the abilities of one of ordinary skill in the art, none of which departs from the scope of the present invention as defined in the appended claims.

What is claimed is:

1. A gas generating system comprising:
a first housing having a first end, a second end opposite the first end, and an outer wall extending between the first and second ends, wherein the first housing is an outermost housing of the gas generating system;
an igniter assembly positioned within the first housing;
a second housing positioned within the first housing in direct contact with the first housing such that an end of the second housing is unsupported, wherein the second housing is secured to the first housing by an interference fit formed by the direct contact between the first and second housings, wherein the interference fit is formed along the wall; and
a gas generant material positioned within the second housing.

2. The gas generating system of claim 1 wherein at least a portion of the first housing reduces from a first, relatively larger interior dimension (D1) to a second, relatively narrower interior dimension (D2), and wherein the interference fit is formed by contact between the first and second housings along the relatively narrower first housing interior dimension.

3. The gas generating system of claim 1 wherein the second housing is secured to the first housing such that a gas flow passage is formed therebetween, and wherein the interference fit forms a closed end of the gas flow passage.

4. The gas generating system of claim 3 wherein the second housing unsupported end is closed and is spaced apart from the igniter assembly so as to form a chamber therebetween, and wherein the chamber is structured for holding a booster material therein and is in fluid communication with the gas flow passage.

5. The gas generating system of claim 1 wherein the second housing unsupported end is closed and is spaced apart from the igniter assembly so as to form a chamber therebetween, and wherein the chamber is structured for holding a booster material therein and is in fluid communication with the gas flow passage.

6. The gas generating system of claim 1 wherein the second housing is in contact with the first housing only along the interference fit.

7. The system of claim 1 further comprising a filter positioned between the interference fit and an end of the first housing.

8. A gas generating system comprising:
a first housing; and
an igniter assembly positioned within the first housing;
a second housing having a first end, the second housing being secured in direct contact with the first housing such that a gas flow passage is defined by and extends between the first and second housings, and such that an entrance to the gas flow passage is defined by the second housing first end and the first housing, wherein the second housing is secured within the first housing such that the second housing first end is unsupported, the second housing unsupported end being closed and spaced apart from the igniter assembly so as to form a chamber therebetween, and wherein the chamber is structured for holding a booster therein and is in fluid communication with the gas flow passage; and
a gas generant material positioned within the second housing;
wherein the system is structured such that, upon activation of the gas generating system, combustion products generated in the chamber impinge upon the second housing closed end and are redirected radially outwardly along the closed end to the entrance to the gas flow passage.

9. The gas generating system of claim 8 wherein the second housing is secured to the first housing only by an interference fit formed directly between the first and second housings.

10. The gas generating system of claim 9 wherein the interference fit forms a closed end of the gas flow passage.

11. The system of claim 9 further comprising a filter positioned between the interference fit and an end of the first housing.

* * * * *